(12) United States Patent
Freisler et al.

(10) Patent No.: US 6,827,369 B2
(45) Date of Patent: Dec. 7, 2004

(54) INSTRUMENT PANEL WITH A MOUNTING FOR A GAS BAG MODULE

(75) Inventors: Werner Freisler, Aalen (DE); Dirk Schultz, Heubach (DE); Gerd Zischka, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/314,061

(22) Filed: Dec. 5, 2002

(65) Prior Publication Data

US 2003/0127838 A1 Jul. 10, 2003

(30) Foreign Application Priority Data

Dec. 7, 2001 (DE) .......................... 101 60 192

(51) Int. Cl.⁷ .............................................. B60R 21/16
(52) U.S. Cl. .................................................. 280/732
(58) Field of Search ................... 280/732, 728.2, 280/728.3

(56) References Cited

U.S. PATENT DOCUMENTS

| | | | | |
|---|---|---|---|---|
| 5,226,670 A | * | 7/1993 | Wright et al. ............... | 280/738 |
| 5,342,083 A | * | 8/1994 | Gentile et al. ............ | 280/728.2 |
| 5,342,090 A | * | 8/1994 | Sobczak et al. ............. | 280/732 |
| 5,533,745 A | * | 7/1996 | Jenkins et al. ............ | 280/728.2 |
| 5,588,675 A | * | 12/1996 | Lotspih ...................... | 280/738 |
| 5,788,267 A | * | 8/1998 | Lotspih et al. ............ | 280/728.2 |
| 5,794,967 A | * | 8/1998 | Manire ..................... | 280/728.3 |
| 5,829,778 A | | 11/1998 | Woolley et al. | |
| 6,022,043 A | | 2/2000 | Harnisch et al. | |
| 6,106,003 A | | 8/2000 | Rahmstorf et al. | |
| 6,457,738 B1 | * | 10/2002 | Labrie et al. ............. | 280/728.3 |
| 6,494,481 B2 | * | 12/2002 | Yasuda ....................... | 280/732 |
| 6,536,802 B1 | | 3/2003 | Sutherland et al. | |

FOREIGN PATENT DOCUMENTS

| | | |
|---|---|---|
| DE | 19646548 | 8/1998 |
| DE | 19704684 | 8/1998 |
| DE | 29917943 | 3/2001 |

* cited by examiner

*Primary Examiner*—Faye M. Fleming
(74) *Attorney, Agent, or Firm*—Tarolli, Sundheim, Covell & Tummino L.L.P.

(57) ABSTRACT

An instrument panel for a motor vehicle comprises an ejection channel for a gas bag of a gas bag module. The ejection channel is constructed in one piece with the instrument panel. A mounting plate is provided on the instrument panel, the gas bag module being adapted to be fastened to the mounting plate.

10 Claims, 6 Drawing Sheets

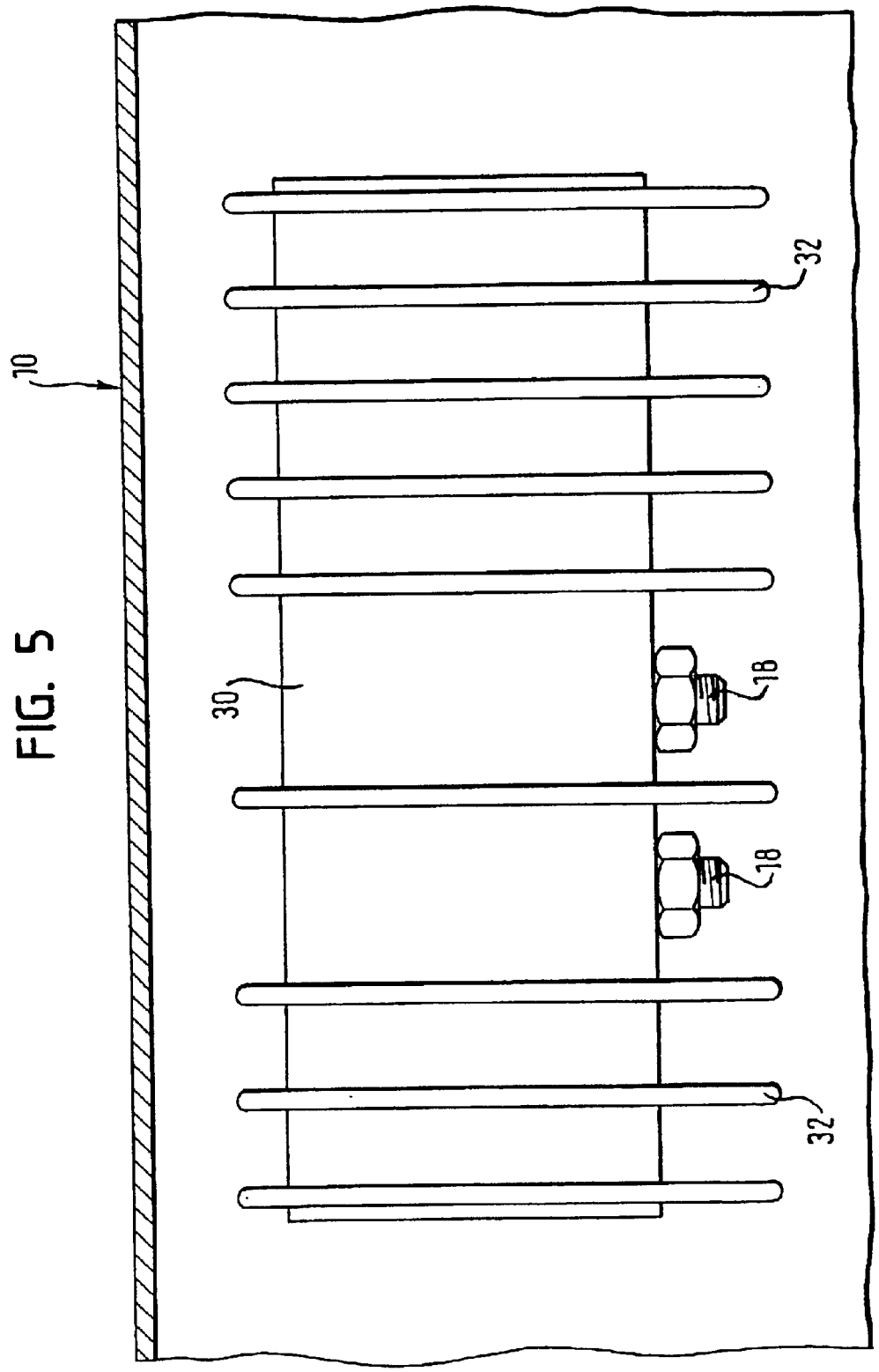

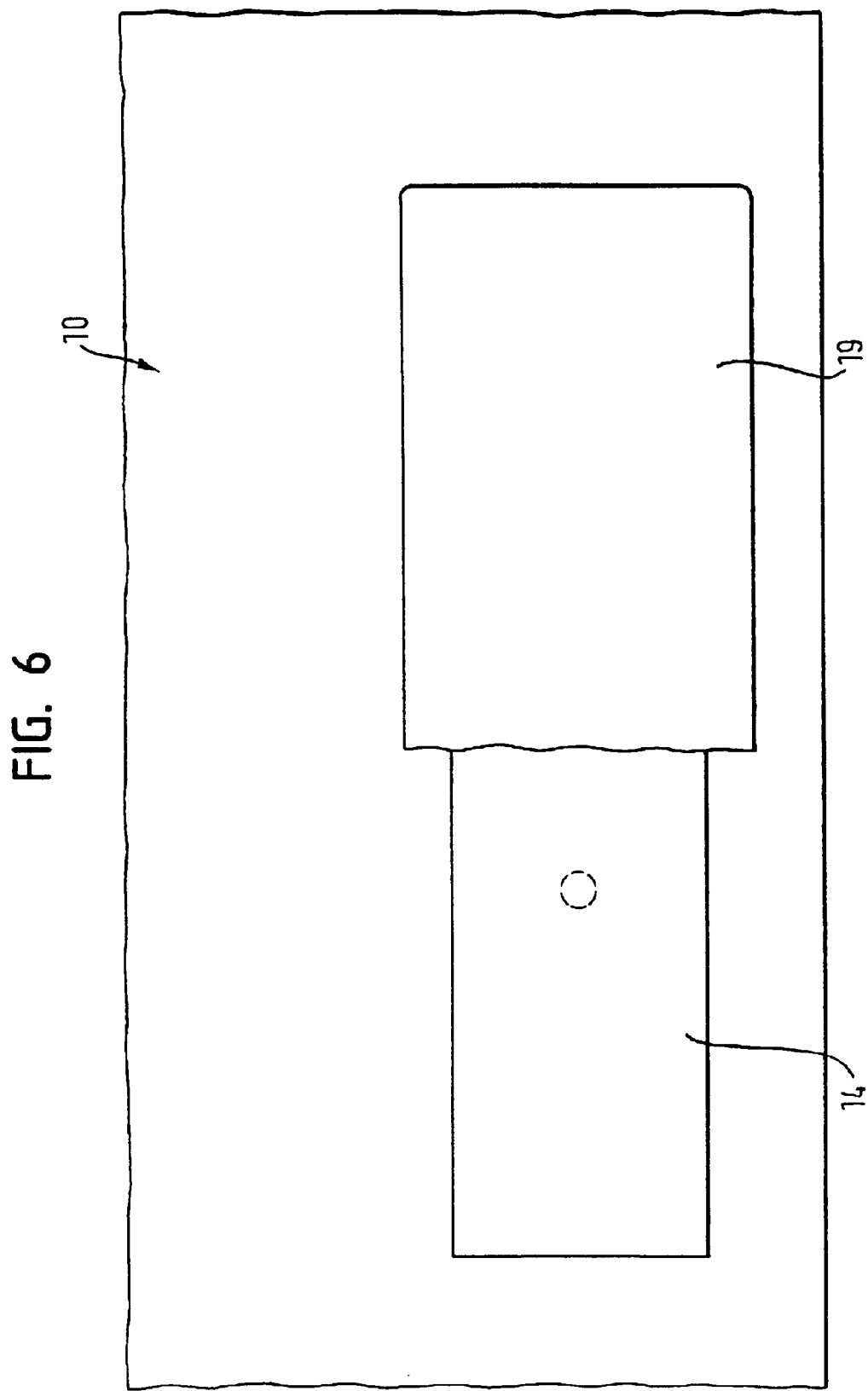

INSTRUMENT PANEL WITH A MOUNTING FOR A GAS BAG MODULE

TECHNICAL FIELD

The invention relates to an instrument panel for a motor vehicle. The invention relates in particular to an instrument panel in which a gas bag module can be arranged.

BACKGROUND OF THE INVENTION

The gas bag module arranged in the instrument panel can be a so-called knee airbag which is provided to make available, in the activated state, a restraining effect for the knees of a vehicle occupant. Such a knee airbag is used in particular in vehicles which are supplied in countries where it is not compulsory to wear seatbelts. The knee airbag is intended to gently intercept and restrain the knees of the vehicle occupant in the case of a frontal impact, so that the lower body of the vehicle occupant is decelerated. The upper body of the vehicle occupant is restrained by a further gas bag.

All the reaction forces which act on the gas bag in the case of restraint must be reliably supported on fixed parts of the vehicle. For this purpose, it is known to fasten the vehicle module on a part of the body of the vehicle behind the instrument panel and to provide in the instrument panel only a passage opening for the gas bag. It is also known to arrange the gas bag module in an expensive housing, which is then screwed to the instrument panel. These embodiments have the disadvantages of high construction expenditure and high weight.

The object of the invention consists in providing an instrument panel which makes it possible to mount the gas bag module on it with minimum expenditure.

BRIEF SUMMARY OF THE INVENTION

According to the invention, an instrument panel for a motor vehicle comprises an ejection channel for a gas bag of a gas bag module. The ejection channel is constructed in one piece with the instrument panel. A mounting plate is provided on the instrument panel, the gas bag module being adapted to be fastened to the mounting plate. The instrument panel is based on the fundamental concept of integrating into the instrument panel all those components which are necessary for arranging the gas bag module and for guiding the gas bag during the unfolding. In this way, a very simple construction is obtained, which consists of a minimum of individual parts. Furthermore, a low weight is the result. Finally, a simple mounting of the gas bag module on the instrument panel is produced, because the gas bag module only has to be pushed into the ejection channel and fastened to the mounting plate.

According to an embodiment of the invention, provision is made that the ejection channel is constructed in the manner of a trough with closed walls. Here, the mounting plate can be formed by a base plate of the trough-like ejection channel. Therefore, all the parts which hitherto were constructed as a separate housing of the gas bag module, are integrated into the instrument panel, and the instrument panel consists merely of one single component.

If necessary, several reinforcement ribs can be arranged on the base plate and on the walls of the ejection channel, so that the ejection channel can not be excessively deformed on unfolding of the gas bag.

According to a second embodiment, provision can be made that the ejection channel is formed by several ribs running parallel to and arranged spaced apart from each other. This construction is based on the knowledge that the ejection channel does not have to be completely closed, but rather that it is sufficient to use a plurality of ribs arranged neighboring each other. The free spaces present between the ribs do not affect the unfolding of the gas bag, as long as the free spaces are so small that the gas bag can not enter into them. The use of ribs arranged spaced apart from each other leads to a further saving on weight.

In this embodiment, the mounting plate can be formed either by a separate part which is fastened to the ribs, for example an insert piece of metal, or may be constructed in one piece with the ribs.

According to the second embodiment, provision can be made that on the rear face of the instrument panel a supporting piece is arranged on which the ribs can rest. In this construction, the instrument panel actually consists of two individual parts, namely a supporting piece arranged so as to be concealed, which is present principally to increase the strength, and also a visible part lying at the front, on which the gas bag module can be arranged.

In both embodiments, a covering for the ejection channel can be provided, which is suitably arranged on the instrument panel.

Advantageous embodiments of the invention will be apparent from the sub-claims.

BRIEF DESCRIPTION OF THE DRAWINGS

FIG. 5 shows a section along the plane V—V of FIG. 4; and

FIG. 6 shows a view in the direction of the arrow VI of FIG. 4.

DETAILED DESCRIPTION OF THE PREFERRED EMBODIMENTS

Figure 1:
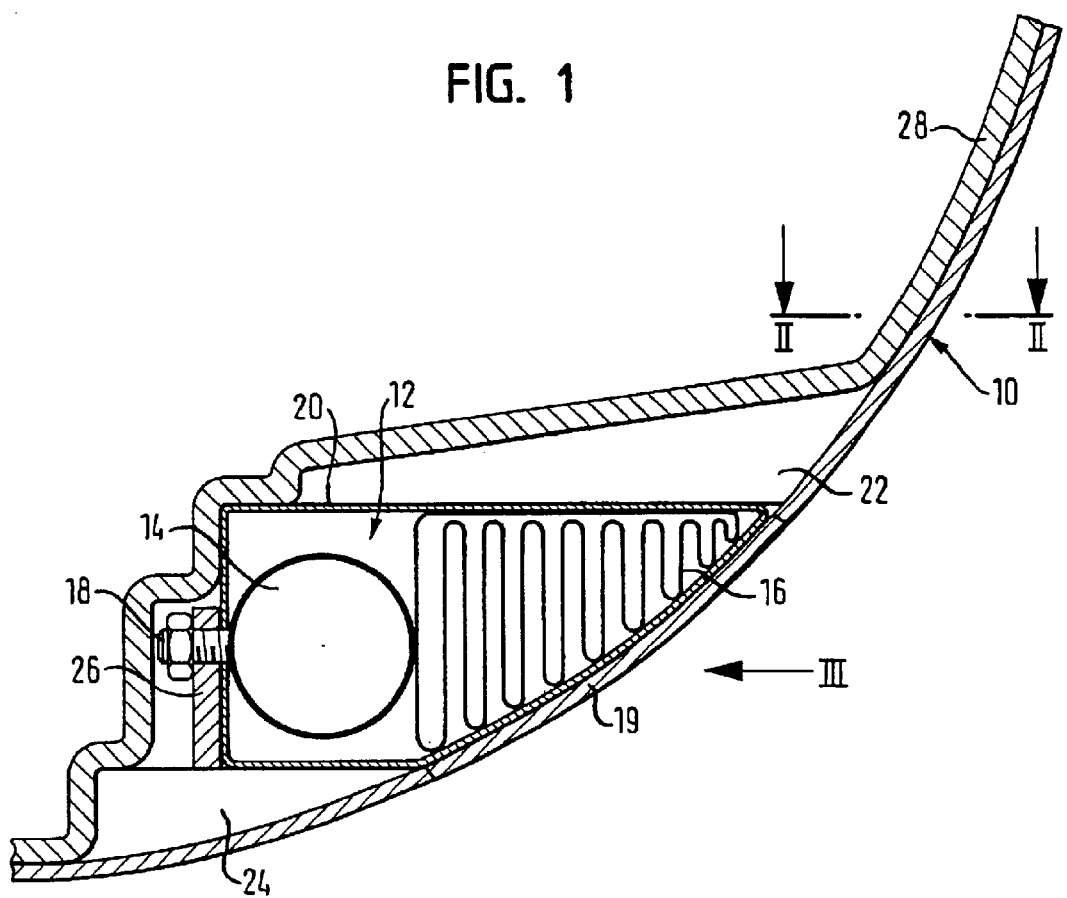
FIG. 1 shows a cross-section through an instrument panel according to a first embodiment of the invention.

In FIG. 1 there is shown an instrument panel 10 according to a first embodiment. The term "instrument panel" is understood to mean the component which is arranged in the interior of a motor vehicle in front of the two vehicle occupants sitting in the front, and on the side of the driver towards the windscreen leads to the instrument holder, and on the side of the passenger usually has a glove compartment.

The instrument panel contains a gas bag module 12 which may, in particular, be a knee airbag. It is basically also possible that the gas bag module 12 is associated with the upper body of a vehicle occupant. The gas bag module 12 contains a gas generator 14 and also a gas bag 16. On the gas generator 14, a mounting screw 18 is provided. A mounting casing 20 extends around the gas generator 14 and the gas bag 16, which casing 20 may be formed by a thin-walled plastic piece, by fabric, a foil, etc. In order to make possible an emergence of the gas bag 16 from the instrument panel, the latter is provided in a known manner with a covering 19, which is defined for example by predetermined breaking points in the instrument panel.

Figure 2:
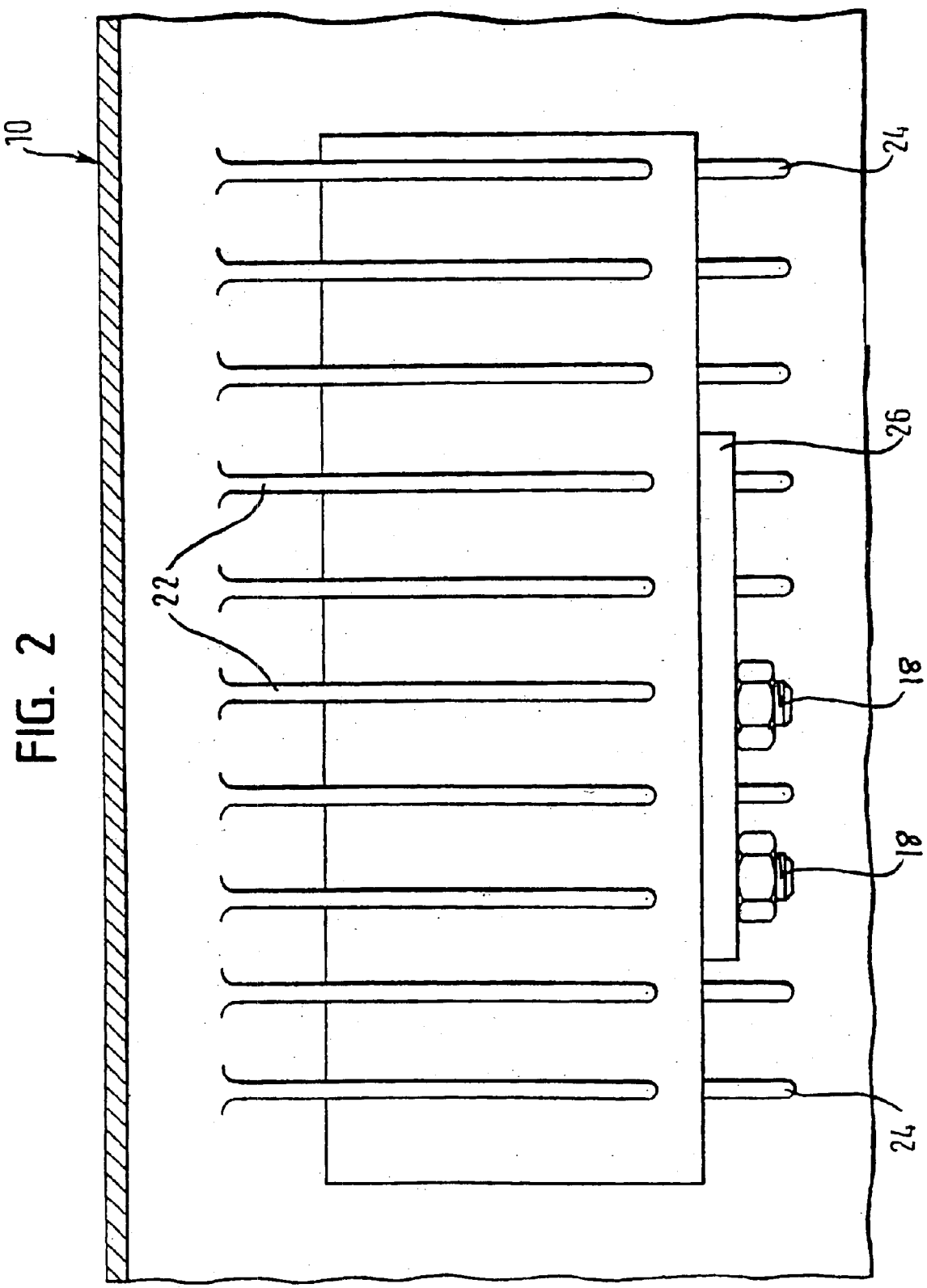
FIG. 2 shows a section through the instrument panel of FIG. 1, the supporting piece not being illustrated.

On the instrument panel 10, several ribs 22, 24 (see also FIG. 2) are arranged in one piece with it, which, when the instrument panel is mounted in a vehicle, extend approximately parallel to the longitudinal direction of the vehicle. The ribs 22, 24 lie opposite each other at such a distance that between them an ejection channel is formed for the gas bag 16 of the gas bag module 12. The term "ejection channel" is understood to mean a guideway which guides the gas bag until it emerges from the gas bag module and the ejection channel. The ejection channel, formed by the ribs 22, 24 has in addition the function of serving as a receiving- and holding space for the gas bag module 12 which is inserted between the ribs.

A mounting plate 26 is constructed in one piece with the ribs 24; the mounting screws 18 of the gas bag module 12 extend through this plate 26. With an activation of the gas bag module, the mounting plate 26 has the function of supporting part of the reaction forces acting on the gas bag 16.

Figure 3:
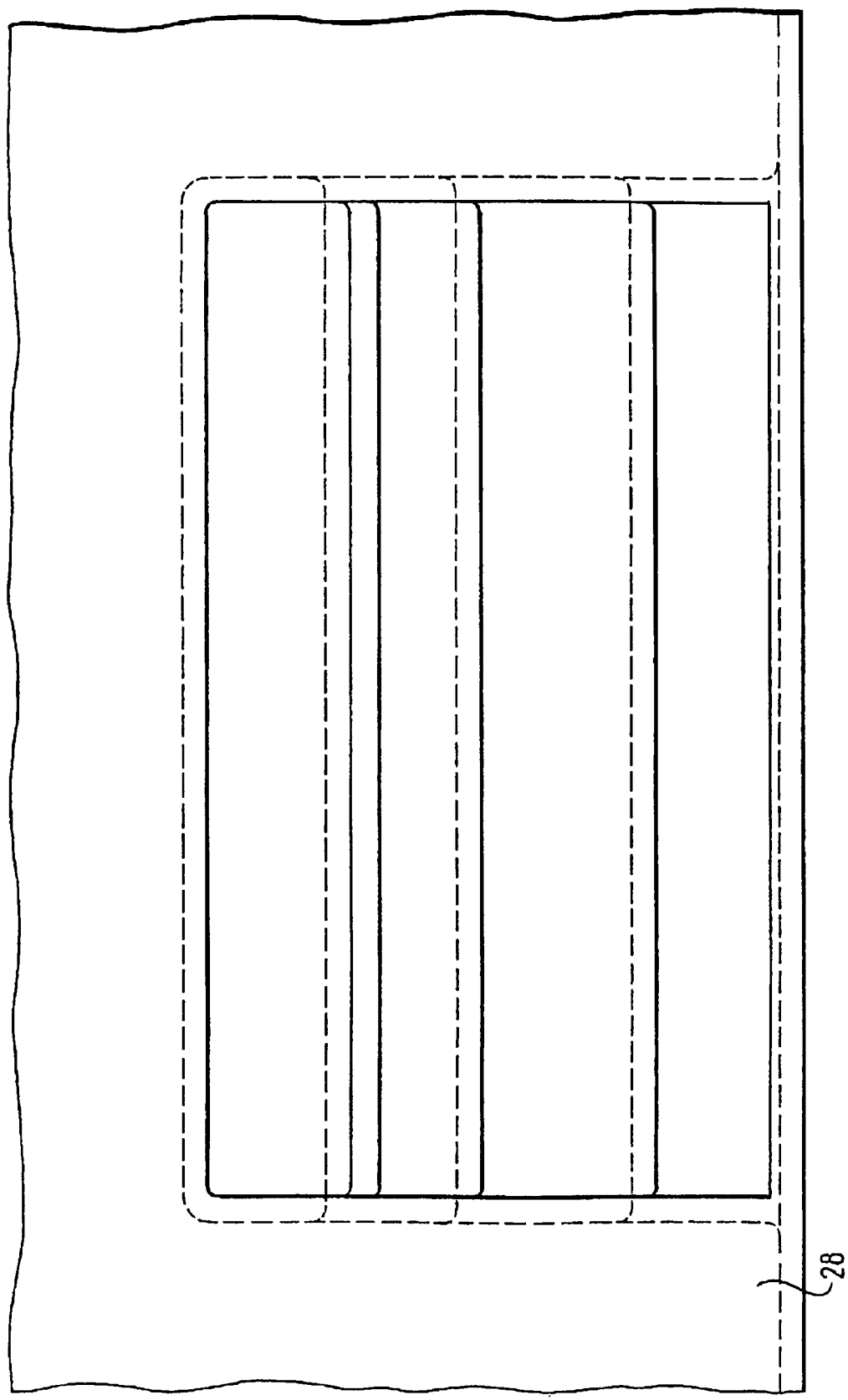
FIG. 3 shows a view in the direction of the arrow III of FIG. 1, the gas bag module and the instrument panel not being illustrated here.

Behind the instrument panel 10, i.e. on the side which is not visible in the installed state, a supporting part 28 is arranged, the contour of which is adapted to the profile of the ribs 22, 24 and also of the gas bag module 12 arranged between the ribs. The supporting part 28 therefore runs in the cross-sectional view of FIG. 1 in a step-like form (see also FIG. 3), so that from top to bottom firstly the ribs 22 are supported, then the rear upper region of the gas bag module 12, then the mounting screws 18 and finally the ribs 24.

Figure 4:
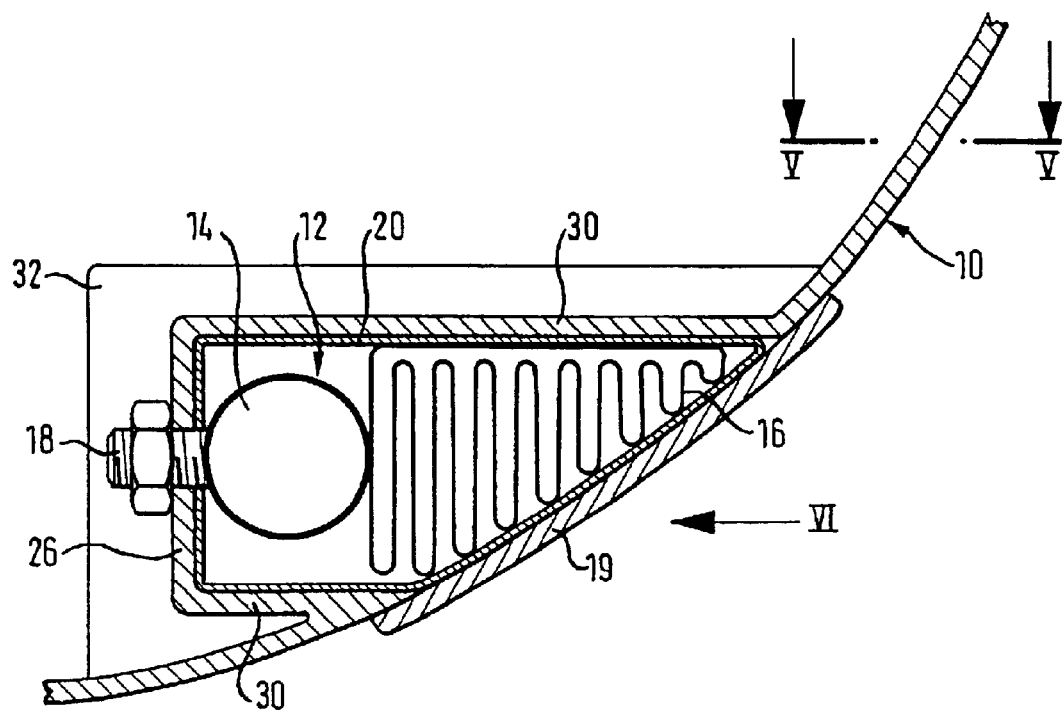
FIG. 4 shows in a section an instrument panel according to a second embodiment of the invention.

In FIGS. 4 to 6 there is shown an instrument panel according to a second embodiment. The same reference numbers are used for the components known from the first embodiment, and reference is to be made to the above explanations.

In contrast to the first embodiment, there is used in the second embodiment an ejection channel which is closed on all sides and is formed by walls 30. With this, a trough-like ejection channel is formed, the base of which is formed by the mounting plate 26. Both the walls 30 and also the mounting plate 26 are constructed in one piece with each other and also in one piece with the instrument panel 10. To increase the mechanical strength of the ejection channel, several reinforcement ribs 32 are provided, which are constructed running around and in one piece with the walls 30 and the mounting plate 26. When the instrument panel 10 is installed in the vehicle, the reinforcement ribs 32 extend approximately parallel to the longitudinal axis of the vehicle.

What is claimed is:

1. An instrument panel for a motor vehicle, the improvement consisting in that an ejection channel for a deployable gas bag of a gas bag module is constructed in one piece with said instrument panel, said instrument panel and said ejection channel not being constructed of separate pieces secured together, said ejection channel being a guide way for guiding the gas bag until the gas bag emerges from the gas bag module, and that a mounting plate is provided on said instrument panel, said gas bag module being adapted to be fastened to said mounting plate.

2. The instrument panel according to claim 1, wherein said ejection channel is constructed in the manner of a trough with closed walls.

3. The instrument panel according to claim 2, wherein said mounting plate is formed by a base plate of said trough-like ejection channel.

4. The instrument panel according to claim 3, wherein several reinforcement ribs are arranged on said base plate and define said ejection channel.

5. The instrument panel according to claim 2, wherein several reinforcement ribs are arranged on said walls of said ejection channel.

6. The instrument panel according to claim 1, wherein said ejection channel is formed by several ribs running parallel to each other and arranged spaced apart from each other.

7. The instrument panel according to claim 6, wherein said mounting plate is formed by a separate part which is fastened to said ribs.

8. The instrument panel according to claim 6, wherein said mounting plate and said ribs are constructed in one piece and not separate pieces secured together.

9. The instrument panel according to claim 6, wherein said instrument panel has a rear face at which a supporting piece is arranged, said ribs being adapted to rest on said supporting piece.

10. The instrument panel according to claim 1, wherein a covering is provided for said ejection channel.

* * * * *